United States Patent [19]

Sato et al.

[11] Patent Number: 4,802,043
[45] Date of Patent: Jan. 31, 1989

[54] MAGNETO-RESISTIVE HEAD FOR PROTECTING AGAINST OUTPUT SPIKE NOISES

[75] Inventors: Naoki Sato, Hachioji; Yoshihisa Kamo, Kokubunji; Tooru Takeura; Masao Katsumata, both of Odawara; Kazuhiro Momata, Chigasaki, all of Japan

[73] Assignee: Hitachi, Ltd., Tokyo, Japan

[21] Appl. No.: 828,349

[22] Filed: Feb. 11, 1986

[30] Foreign Application Priority Data

Mar. 25, 1985 [JP] Japan .................................. 60-58399
Jul. 10, 1985 [JP] Japan .................................. 60-150177

[51] Int. Cl.$^4$ ............................................. G11B 5/27
[52] U.S. Cl. .................................................. 360/113
[58] Field of Search ............ 360/113, 122; 338/32 R; 324/252

[56] References Cited

U.S. PATENT DOCUMENTS

| | | | |
|---|---|---|---|
| 4,277,808 | 7/1981 | Nagaki | 360/113 |
| 4,317,149 | 2/1982 | Elser et al. | 360/110 X |
| 4,503,394 | 3/1985 | Kawakami et al. | 360/113 X |
| 4,516,179 | 5/1985 | Imakooki et al. | 360/113 |
| 4,523,243 | 6/1985 | Billington | 360/113 |
| 4,626,946 | 12/1986 | Vinal | 360/113 |

FOREIGN PATENT DOCUMENTS

| | | | |
|---|---|---|---|
| 0127918 | 8/1982 | Japan | 360/122 |
| 0108026 | 6/1983 | Japan | 360/113 |
| 0220241 | 12/1983 | Japan | 360/113 |
| 0152521 | 8/1984 | Japan | 360/113 |
| 0165228 | 9/1984 | Japan | 360/113 |

OTHER PUBLICATIONS

IBM Technical Disclosure Bulletin vol 21, No. 11, Apr. 1979 Electrostatic Shielding for Magneto Resistive Read Heads, Rohen.

Primary Examiner—Robert S. Tupper
Assistant Examiner—Andrew L. Sniezek
Attorney, Agent, or Firm—Antonelli, Terry & Wands

[57] ABSTRACT

The present invention relates to the structure of a magneto-resistive head for reducing the spike noises generated in the head and for increasing the signal to noise ratio when the information is reproduced. In order to achieve the object, an electric conductor layer is disposed at both sides or one side of a magneto-resistive element, and the conductor layer is isolated from the element and connected to a DC potential.

8 Claims, 9 Drawing Sheets

MAGNETO-RESISTIVE HEAD FOR PROTECTING AGAINST OUTPUT SPIKE NOISES

BACKGROUND OF THE INVENTION

The present invention relates to a structure of a magneto-resistive head, and in particular to a head structure suitable for decreasing the drop in the S/N ratio which is caused by external noises superimposed over the reproduced signals when signals are read out.

Densities of magnetic recording units have been increased more and more. As heads for realizing such recording units, thin film heads with the thin film technique applied thereto have been brought into use. Among these thin film heads, a magneto-resistive head for multitrack (hereafter referred to as MR head) utilizing the magneto-resistive effect of a ferromagnetic thin film advantageously provides a high level output despite its high recording density, because its reproduced output does not depend on the relative speed between the recording medium and the magnetic head, but depends only upon the magnitude of the signal magnetic field caused by the recording medium. The MR heads are being applied to magnetic recording units in various fields as reproducing heads.

Figure 2:
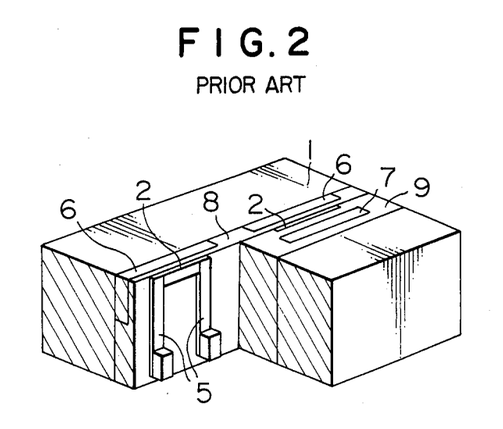
FIG. 2 is an oblique view of an MR head of the prior art.

The general structure of the MR head is disclosed in Japanese Patent Unexamined Publication No. 50-59023. On a base plate 1, a pair of magnetic shield layers 6,7 are provided on both side faces of an MR element 2 via thin isolation layers 8,9 as illustrated in FIG. 2. A conductor layer 5 for allowing flow of a drive current into the MR element and for taking out a reproduced signal from the MR element is connected to the MR element 2. The magnetic shield layers 6,7 are provided to shield an unnecessary part of the signal magnetic field caused by the recording medium, which part is sensed by the MR element 2 but is not needed. Thus the frequency characteristics of the reproduced signal is improved and the resolution is increased by including these magnetic shield layers 6 and 7.

In such a structure, however, spike noises are caused if a recording medium which is an isolator runs in a narrow gap facing the head surface. When the information is reproduced, such spike noises lower the signal to noise ratio and cause reproduction errors.

SUMMARY OF THE INVENTION

An object of the present invention is to provide a magneto-resistive head which is free from the above described problem of spike noises attendant upon the head of the prior art and which reduces the spike noises.

Figure 1:
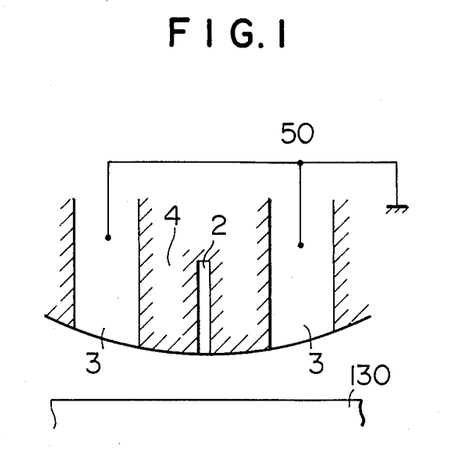
FIG. 1 is a sectional view of structures of an MR head and a recording medium for illustrating the concept of the present invention.

The present inventors examined the above described problem of occurrence of the spike noises in detail. As a result, the cause of the occurrence of the spike noises was clarified as follows. Friction and contact are caused between the medium 130 and the head surface as illustrated in FIG. 1. As a result, frictional electricity is generated and stored on the head surface. The electricity is concentrated onto the conductor part (e.g. the shield layer 3) of the head surface, causing the voltage of the conductor to be being significantly varied. An isolation layer 4 is provided between the magneto-resistive element 2 and these conductor parts. If the voltage difference between the magneto-resistive element 2 and the conductor part 3 increases so as to exceed the breakdown voltage of air, however, insulation breakdown occurs between the magneto-resistive element 2 and the conductor part 3. The influence of the breakdown is observed in the output of the magneto-resistive head 2 as spike noises. The present inventors thus found the cause of occurrence of spike noises characteristic of the magneto-resistive head 2. Furthermore, the present inventors devised a concrete structure of a magneto-resistive head 2 capable of reducing the noise included in the reproduced signal as described below. In accordance with a feature of the present invention, an electric conductor layer isolated from the magneto-resistive element is provided on both sides or on one side of the magneto-resistive element and the electric conductor layer is connected to a direct current potential. The electricity due to the friction or the like caused when the recording medium runs can thus be removed through the electric conductor layer. In accordance with another feature of the present invention, a member for shielding a plurality of magneto-resistive elements as one body is connected to a direct current potential for the purpose of further deceasing the noise even for a multitrack magneto-resistive head. Notches are provided for preventing the leakage of signals between a plurality of magneto-resistive elements.

BRIEF DESCRIPTION OF THE DRAWINGS

FIG. 3b is a sectional view seen along a line IIIb—IIIb illustrated in FIG. 3a.

FIG. 4b is a sectional view seen along a line IVb—IVb illustrated in FIG. 4a.

FIG. 5b is a sectional view seen along a line Vb—Vb illustrated in FIG. 5a.

FIG. 8b is a sectional view seen along a line VIIIb—VIIIb illustrated in FIG. 8a.

FIG. 9b is a sectional view seen along a line IXb—IXb illustrated in FIG. 9a.

FIG. 10b is a sectional view seen along a line Xb—Xb illustrated in FIG. 10a.

FIG. 11b is a sectional view seen along a line XIb—XIb illustrated in FIG. 11a.

FIG. 12b is a plane view of an embodiment which is a variant to the embodiment of FIG. 12a. FIG. 12c is a plane view of another embodiment which is another variant of the embodiment of FIG. 12a.

FIG. 13a is a sectional view seen along a line XIIIa—XIIIa of FIG. 12a. FIG. 13b is a sectional view seen along a line XIIIb—XIIIb of FIG. 12a. FIG. 13c is a sectional view seen along a line XIIIc—XIIIc of FIG. 12a.

DESCRIPTION OF THE PREFERRED EMBODIMENTS

Embodiments of the present invention will now be described concretely.

FIG. 1 is a sectional view of the structure of an MR head for illustrating the concept of the present invention. Conductive permeable shield layers (e.g. permalloy) 3 are disposed on both sides of the MR element 2 via insulation layers (e.g. SiO2) 4. A terminal 50 is taken out from the conductive shield layers 3 and is grounded. The end of the head is exposed to form a surface confronting the recording medium 130. And the end of the head is curved with respect to the direction in which the recording medium extends. The MR element 2 is positioned at the peak of the curved surface. In this embodiment, the electricity due to the friction or the like can be removed and the occurrence rate of spike noises caused by the medium 130 running through the narrow gap can be improved from two or three times per second to 0 times per second.

A similar effect can be obtained even if either the shield layer 3 of one side or the shield layers 3 of both sides are made of nonmagnetic conductor layers.

Figure 3A:
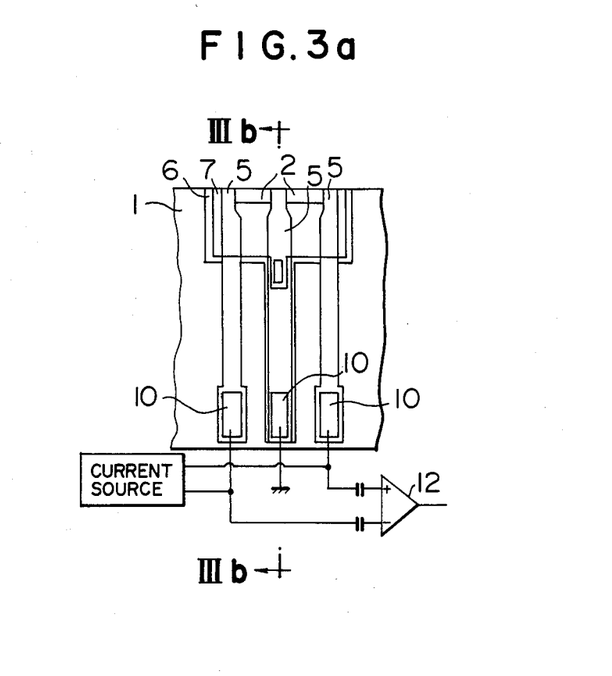
FIG. 3a is a plane view of a first embodiment according to the present invention.
Figure 3B:
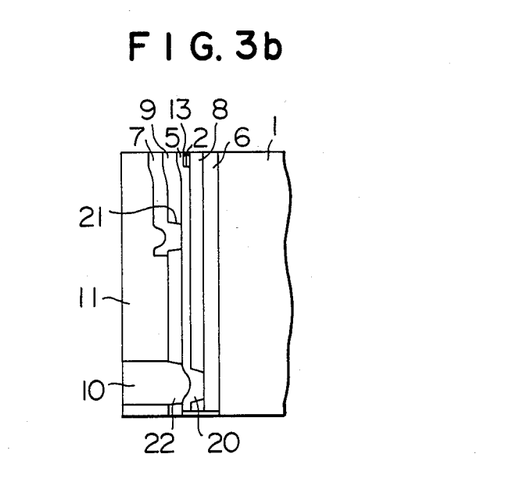

Concrete embodiments of the present invention will now be described by referring to the drawings. FIG. 3a is a plane view of an example of a head according to the present invention. FIG. 3b is a sectional view of the head seen along a line IIIb—IIIb illustrated in FIG. 3a. In an MR head, a suitable bias field must be applied to the MR element in order to linearize the operation characteristics of the MR head and eliminate the distortion of the reproduced waveform. As methods for applying the bias field to the MR element, the shunt biasing method and the permanent magnet biasing method are known. In the shunt biasing method, the bias field is produced by providing a current through the layer of a conductive material adjacent to the MR element. In the permanent magnet biasing method, a permanent magnet layer is disposed near the MR element and the leakage field of the permanent magnet layer is used as the bias field. The present embodiment will be described with respect to an MR head using the shunt biasing method.

After a lower shield layer 6 of a magnetic material such as permalloy is formed on a base plate 1, a first isolation layer 8 of an isolation material such as Al2O3 or SiO2 is formed. And after an MR element 2 (e.g. permalloy) is formed, a bias layer 13 of a conductive material such as Ti is formed. Then the first isolation layer 8 is etched to make a through-hole 20. Subsequently, a conductor layer 5 of Au, Al, Cu or the like is formed and electrically coupled to the lower shield layer 6. The through-hole may be formed immediately after the first isolation layer 8 has been formed. Then a second isolation layer 9 of Al2O3, SiO2 or the like is formed and etched to make a through-hole 21. Furthermore, an upper shield layer 7 of a magnetic material such as permalloy is formed and electrically coupled to the conductive layer 5. Thereafter, the second isolation layer 9 is etched to make a through-hole 22. Subsequently, a terminal 10 of a conductive material such as Au, Al, Cu or the like is formed and electrically coupled to the conductor layer 5. Finally, a protection layer 11 of Al2O3, SiO2 or the like is formed, and its surface is processed by lapping or the like until the terminal 10 is exposed. In the above described structure, the lower shield layer 6 and the upper shield layer 7 are electrically coupled to the terminal 10 through the conductor layer 5. If the central terminal 10 is connected to ground, and a current source for driving the MR element 2 and a differential amplifier 12 for amplifying the reproduced signal read out from the MR element 2 are connected between two remaining terminals 10 as shown in FIG. 3a, therefore, noises read out from the MR element 2 are canceled by the differential amplification. The noises of the lower shield layer 6 and the upper shield layer 7 can be removed through the grounded terminal 10. Thus, the noises generated by the whole MR head can be reduced, the S/N ratio being improved.

A similar effect can be obtained if the upper or lower shield layer is made of a nonmagnetic conductor layer.

Figure 4A:
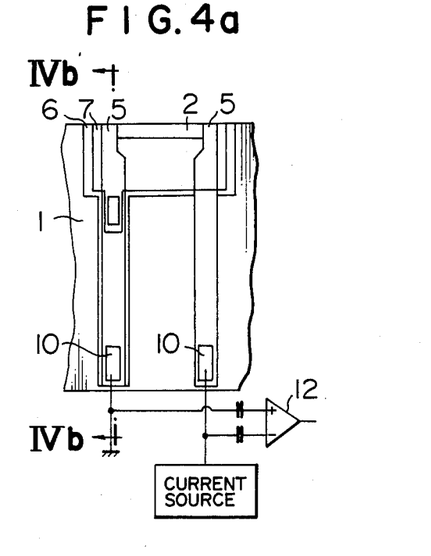
FIG. 4a is a plane view of a second embodiment according to the present invention.
Figure 4B:
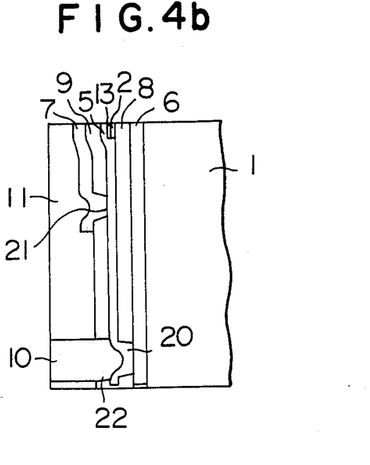

FIG. 4a shows an embodiment of a shunt biased MR head having a two terminal structure according to the present invention, in which two conductor layers 5 are formed with respect to the MR element 2. FIG. 4b is a sectional view of the head seen along a line IVb—IVb illustrated in FIG. 4a. The lower shield layer 6 and the upper shield layer 7 are coupled to either one of the conductor layers 5 connected to the MR element 2. In this case, the structure and fabrication process for electrically coupling the conductor layer 5 to the lower shield layer 6 and the upper shield layer 7 by means of the through-hole 20 formed in the first isolation layer and through-holes 21 and 22 formed in the second isolation layer 9 are the same as those of the embodiment illustrated in FIGS. 3a and 3b. Only the plane figure of FIG. 4a is different from that of FIG. 3a. If the terminal 10 disposed on the conductor layer 5 with the upper shield layer 7 and the lower shield layer 6 connected thereto is grounded, and the current source and the differential amplifier 12 are connected between that terminal 10 and the remaining terminal 10, the noises can be reduced in the same way as the embodiment of FIGS. 3a and 3b.

Figure 5A:
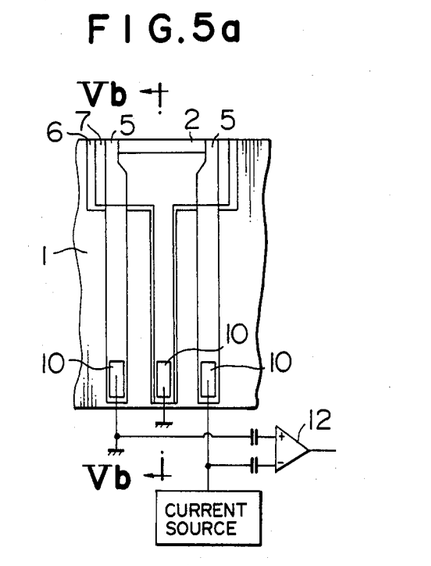
FIG. 5a is a plane view of a third embodiment according to the present invention.
Figure 5B:
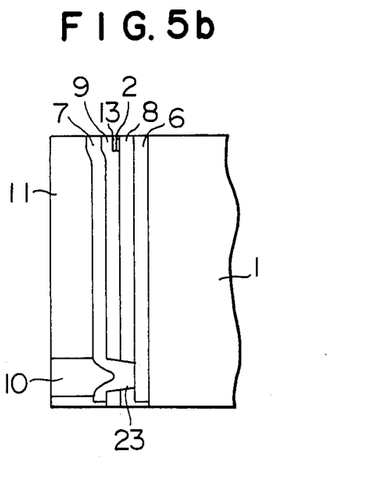

FIG. 5a is a plane view of another embodiment of an MR head according to the present invention. FIG. 5b is a sectional view of the MR head seen along a line Vb—Vb illustrated in FIG. 5a. The MR head of this structure is characterized in that a terminal 10 of a conductive material such as Au, Al, or Cu is disposed in a different position than the terminal 10 disposed on the conductor layer 5, to connect the lower shield layer 6 and the upper shield layer 7 to the ground in an external circuit. The fabrication method for the MR head illustrated in FIGS. 5a and 5b will now be described.

After the lower shield layer 6, the first isolation layer 8, the MR element 2, a bias layer 13, the second isolation layer 9 are successively formed on the base plate 1, a through-hole 23 is formed through the first isolation layer 8 and the second isolation layer 9. Thereafter, the upper shield layer 7 is formed and electrically coupled to the lower shield layer 6. After the terminal 10 is formed, the protection layer 11 is formed and processed by lapping or the like until the terminal 10 is exposed to the surface. Thereby the terminal 10 is electrically coupled to the lower shield layer 6 and the upper shield layer 7. By grounding the terminal 10 and connecting the current source and the differential amplifier 12 between the remaining terminals 10, the noises of the MR head can be reduced in the same way as the embodiments described before.

Figure 6:
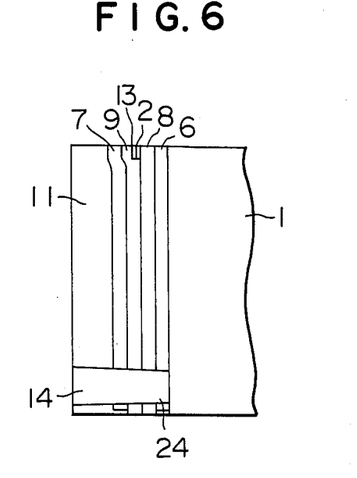
FIG. 6 is a sectional view of a fourth embodiment according to the present invention.

Other embodiments of the present invention will now be described. FIG. 6 is a sectional view of an embodiment in which the structure of the through-hole 23 located at the terminal 13 of the MR head illustrated in FIGS. 5a and 5b is modified. After the lower shield layer 6, the first isolation layer 8, the MR element 2, the bias layer 13, the second isolation layer 9, and the upper shield layer 7 are formed, all of the layers are etched to make a through-hole 24. Thereafter, a terminal 4 of Au, Cu or the like and the protection layer 11 are formed. The through-hole 24 may alternately be formed by etching up to the first isolation layer 8 without etching the lower shield layer 6. In this structure as well, the terminal 14 can be electrically coupled to the lower shield layer 6 and the upper shield layer 7. Furthermore, this structure can be applied to the MR heads having structures shown in FIGS. 3a, 3b, 4a and 4b. That is to say, the through-holes 20 and 22 may be simultaneously formed after the upper shield layer 7 has been formed.

Figure 7:
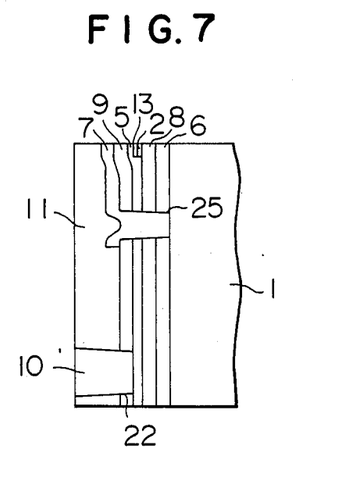
FIG. 7 is a sectional view of a fifth embodiment according to the present invention.

FIG. 7 is a sectional view of an embodiment in which the structure of the through-hole 21 of the MR heads shown in FIGS. 3b and 4b is modified. After the second isolation layer 9 has been formed, all of the layers are etched to make a through-hole 25. The through-hole 25 may alternately be formed by etching up to the first isolation layer 8. By forming the upper shield layer 7 thereafter, the conductor layer 5 can be electrically coupled to the upper shield layer 7 and the lower shield layer 6.

Figure 8A:
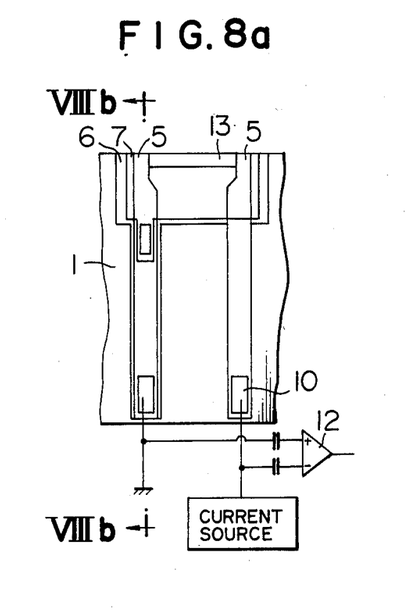
FIG. 8a is a plane view of a sixth embodiment according to the present invention.
Figure 8B:
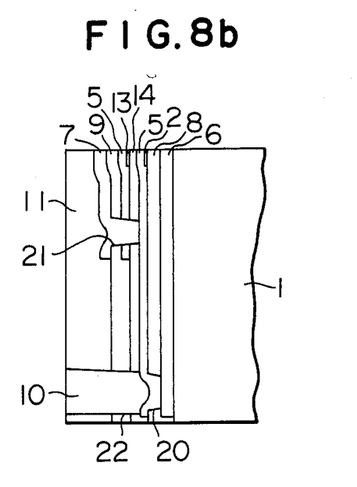

FIG. 8a is a plane view of an embodiment of an MR head of a permanent magnet bias type having a two terminal structure according to the present invention, in which two conductor layers 5 are formed with respect to the MR element 2. FIG. 8b is a sectional view of the MR head shown in FIG. 8a. The lower shield layer 6 and the upper shield layer 7 are connected to either one of the conductor layers 5 connected to the MR element 2. In this case, the structure and the fabrication process for electrically coupling the conductor layer 5 to the lower shield layer 6 and the upper shield layer 7 via the through-hole 20 formed in the first isolation layer 8 and the through-holes 21 and 22 formed in the second isolation layer 9 are the same as those of the embodiment of shunt bias type shown in FIGS. 3a and 3b. Only the sectional structure is different from that of FIGS. 3a and 3b. A layer 14 illustrated in FIG. 8b is an isolation layer for isolating a permanent magnet layer 13 from the MR element 2. Either one of terminals of the permanent magnet layer 13 which is a bias element is connected to the conductor layer 5 taken out from the MR element 2 via the conductor layer 5. Accordingly, the electricity generated in the permanent magnet layer 13 is immediately discharged through the terminal 10, thereby preventing noise spikes.

Figure 9A:
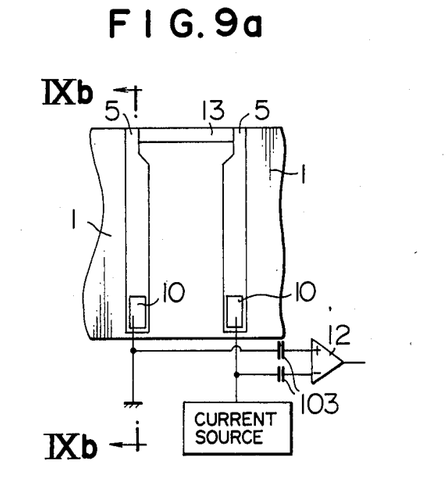
FIG. 9a is a plane view of a seventh embodiment according to the present invention.
Figure 9B:
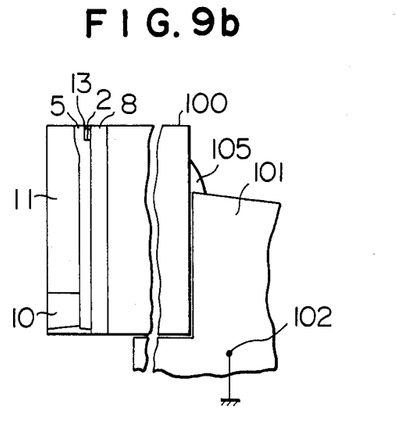

FIG. 9a is a plane view of an embodiment of a non-shield, shunt biased MR head having a two terminal structure according to the present invention, in which the shunt bias layer 13 is formed over the MR element, and two conductor layers 5 are formed at both ends of the shunt bias layer 13. FIG. 9b is a sectional view of the MR head shown in FIG. 9a. After the first isolation layer 8 has been formed on the nonmagnetic conductive base plate 1 made of alumina titanium carbide ($Al_2O_3$-TiC) or the like, the MR element 2 is formed. Subsequently, the bias layer 13 of a conductive material such as titanium (Ti) or molybdenum (Mo) is formed and thereafter the conductor layers 5 are formed at both ends of the bias layer 13. Then the terminal 10 is formed.

Furthermore, the protection layer 11 is formed, and its surface is subjected to lapping until the terminal 10 is exposed. Finally, an MR head element block 100 is fixed to a head block 101 made of a metal material such as bronze by means of a conductive binding agent 105. At this time, a terminal 102 is provided in the head block 101 by means of a screw hole, for example. If the terminal 102 and the terminal 10 taken out from the MR element are grounded, and the current source is connected to the remaining terminal 10, the AC voltage difference between the terminals 10 and 10 is read out through capacitors 103 and a differential amplifier 12. The electricity generated on the surface of the base plate 1 by friction is immediately discharged through the terminal 102, thereby preventing noise spikes.

Figure 10A:
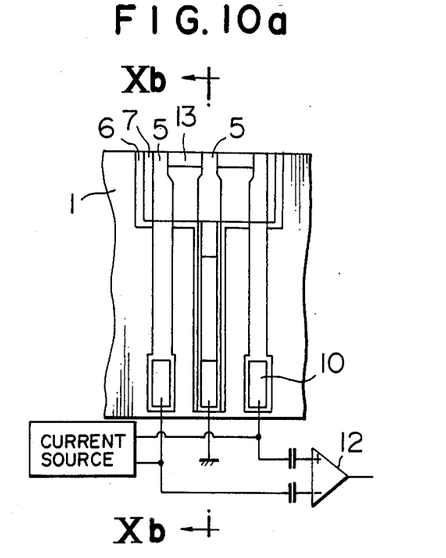
FIG. 10a is a plane view of an eighth embodiment according to the present invention.
Figure 10B:
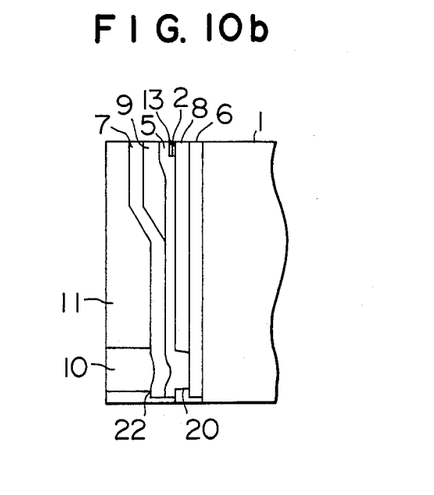

FIGS. 10a and 10b show an embodiment of a differential MR head according to the present invention. FIG. 10a is a plane view of the MR head. FIG. 10b is a sectional view of the MR head. After the lower shield layer 6 has been formed on the base plate 1, the first isolation layer 8 is formed. Subsequently, the MR element 2 is formed, and then the bias layer 13 of a conductive material such as Ti is formed. The first isolation layer 8 is etched to make the through-hole 20. Then the conductor layer 5 is formed and electrically coupled to the lower shield layer 6. The second isolation layer 9 is formed and etched aslant to expose the conductor layer 5 of the center part to the surface. Furthermore, the upper shield layer 7 is formed and electrically coupled to the conductor layer 5. Subsequently, the terminals 10 are formed. Finally, the protection layer 11 is formed and processed by lapping or the like until the terminals 10 are exposed to the surface. In the above described structure, the lower shield layer 6, the upper shield layer 7, and the conductor layer 5 are electrically coupled to the terminals 10. If the central terminal 10 is grounded, and the current source for driving the MR element 2 and the differential amplifier 12 for amplifying the reproduced signal read out from the MR element 2 are connected between two remaining terminals 10, the signal read out from the MR element 2 undergoes differential amplification and at the same time the electricity generated in the upper and lower shield layers is immediately discharged through the central terminal 10. Therefore, the noises of the MR head are reduced, resulting in the increased S/N ratio. In this embodiment, the through-holes can be formed in only one processing step, resulting in the simplified processing.

Figure 11A:
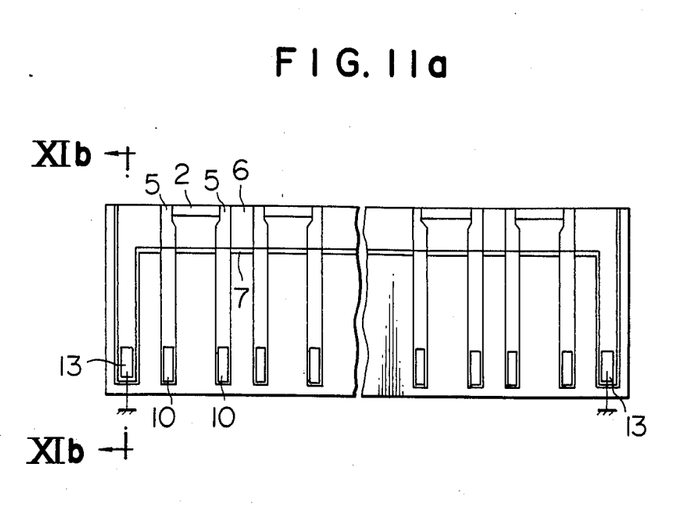
FIG. 11a is a plane view of a first embodiment of a multitrack MR head according to the present invention.
Figure 11B:
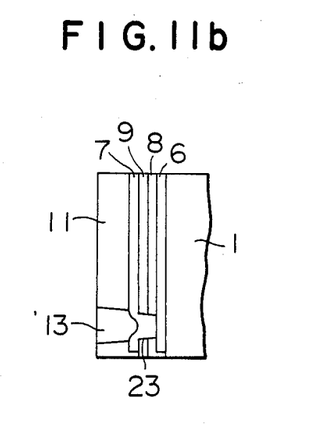

In a multitrack MR head having a structure in which shield layers of respective elements are united as one body, the upper shield layer and the lower shield layer can be easily grounded by using the above described structure. FIG. 11a is a plane view of an MR head for illustrating that embodiment. FIG. 11b is its sectional view. In places different from those of the current source for driving the MR element 2 and the terminals 10 for reading out the reproduced signals, terminals 13 for grounding the lower shield layer 6 and the upper shield layer 7 are disposed. The terminal 13 may be disposed at one side. However, the noise reducing effect is enhanced if the terminals 13 are disposed at both sides. The fabrication method is the same as that of FIGS. 5a and 5b. Furthermore, the structure and the fabrication method illustrated in FIGS. 4a and 4b can also be applied to a multielement MR head having a structure in which shield layers of respective elements are united as one body. That is to say, over one or two conductor layers 5 among a plurality of elements, the conductor layer 5 is electrically coupled to the lower shield layer 6 and the upper shield layer 7 by using the structure and the fabrication method illustrated in FIGS. 4a and 4b. Furthermore, the terminals 10 for connecting the conductor layers 5 to external circuits are disposed. Owing to these, the noises of the multielement MR head having a structure in which the shield layers are united as one body can be reduced. In the embodiment described above, both the upper shield layer 7 and the lower shield layer 6 can be grounded. The structure for grounding either the upper shield layer 7 or the lower shield layer 6 can be easily analogized from the foregoing embodiment. For example, only the upper shield layer 7 illustrated in FIGS. 3a, 3b, 4a and 4b can be connected to the conductor layer 5 by avoiding the formation of the through-hole 20 of the first isolation layer 8 in case of FIGS. 3a, 3b, 4a, and 4b, and avoiding the formation of the through-hole 23 of the first isolation layer 8 and the second isolation layer 9 in case of FIGS. 5a and 5b.

Figure 12A:
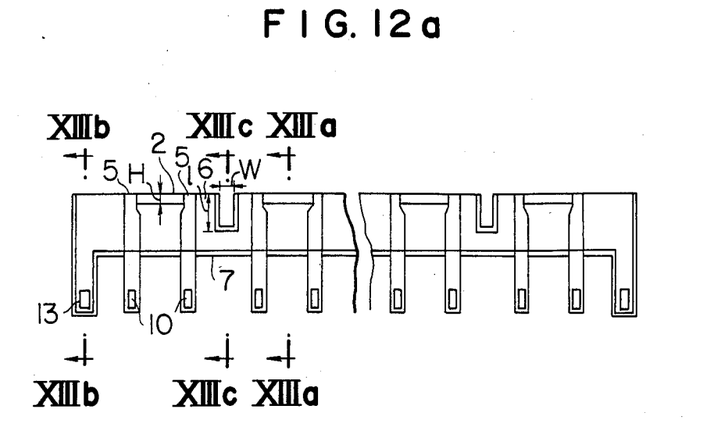
FIG. 12a is a plane view of a second embodiment of a multitrack MR head according to the present invention.
Figure 12B:
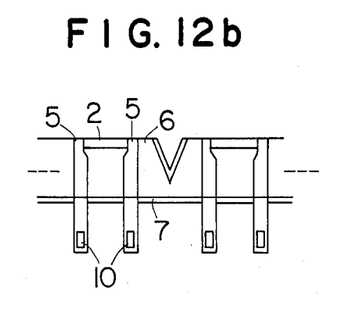

Other embodiments of a multitrack MR head according to the present invention will now be described by referring to FIGS. 12a to 12c and 13a to 13c. FIG. 12a is a plane view of an example of a head according to the present invention. FIGS. 13a, 13b and 13c are sectional views seen along lines XIIIa—XIIIa, XIIIb—XIIIb, and XIIIc—XIIIc, respectively. In the MR head, a suitable bias field must be applied to the MR element 2 in order to linearize the operation characteristics and improve the sensitivity. As methods for applying the bias field to the MR element, the shunt biasing method and the permanent magnet biasing method are known as described before. The present embodiment will be described for the MR head with the shunt biasing method thereto.

After a first shield layer 6 of a conductive soft magnetic material such as permalloy is formed on the base plate 1, the first isolation layer 8 of an isolation material such as $Al_2O_3$ or $SiO_2$ is formed. And after the MR element 2 (e.g. permalloy) is formed, the bias layer 13 of a conductive material such as Ti is formed. Then the second isolation layer 9 of $Al_2O_3$, $SiO_2$ or the like is formed. The through-hole 20 is made through the isolation layers 8 and 9 to ensure the conductivity with the second shield layer 7 and the first shield layer 6. The terminal 10 of a conductive material such as Au, Al or Cu is formed on the upper part of the through-hole. Finally, the protection layer 11 of $Al_2O_3$, $SiO_2$ or the like is formed and processed by lapping or the like until the terminal 10 i exposed to the surface. In the above described structure, the first shield layer 6 is electrically connected to the second shield layer 7 at the terminal 10 via the through-hole. By connecting the terminal 10 to either a fixed potential or the ground, it becomes possible to discharge the noises which enter the shield layer and prevent them from leaking into the MR element. As illustrated in FIG. 12a, a region of the shield layer between the MR elements, which is W in width and L in depth, is removed. The width W must be wide enough not to short-circuit the magnetic flux entering the shield layer at this region. And the width W must be at least the shield spacing (approximately the sum of thickness of the isolation layers 8 and 9 illustrated in FIG. 13). The suitable value of W is usually about three to five times the shield spacing. The depth L is desired to be large so long as the conductivity of the shield between tracks can be ensured. The depth L must be not less than the width H of the MR element 2 and is usually chosen to be two to three times the width H. Since in the embodiment the shield spacing was 2 μm and the height H of the MR element was 10 μm, the width and depth were decided as W=5 μm and L=25 μm, and the electrode 10 was grounded. The external noise could be reduced to nearly zero. In addition, the signal leakage from the adjacent track could be reduced to one third of that of the structure illustrated in FIG. 11.

Figure 12C:
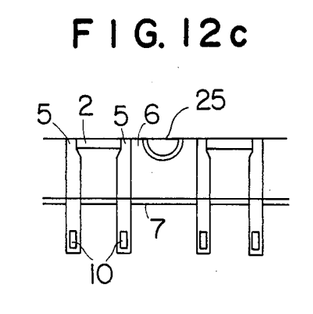
Figure 13A:
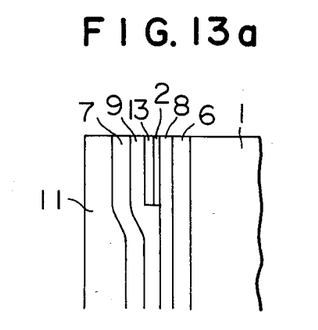
Figure 13B:
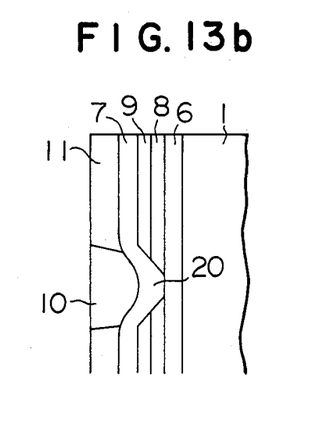
Figure 13C:
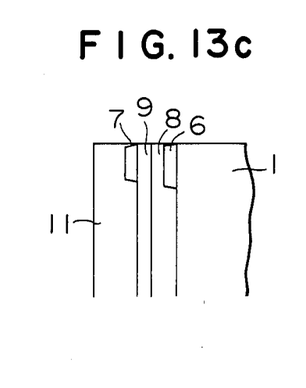

It is evident that a similar effect can be obtained if the region with the shield removed is formed by an isolator 25 as shown in FIG. 12c.

In the above description of this embodiment, the shunt biasing method was used to bias the MR element. However, it is evident that the effect of the present invention can be similarly obtained even if other biasing methods are used.

In this embodiment, the removed region of the shield layer was rectangular. However, it is evident that a similar effect can be expected even if the shape is triangular as illustrated in FIG. 12b or is curvilinear as illustrated in FIG. 12c.

Further, the terminal taken out from the shield was grounded in this embodiment. However, it is evident that a similar effect can be obtained even if the terminal is coupled to a fixed DC potential such as a potential appearing at a center tap when the MR elements 2 are connected in a differential mode.

We claim:

1. A magneto-resistive head for protecting against output spike noises, comprising:
   a plurality of magneto-resistive elements formed on a first side of a first isolation layer;
   a plurality of conductor layers formed on said first side of said first isolation layer and connected to said magneto-resistive elements for supplying drive currents to said magneto-resistive elements and for transferring reproduction signals out from said magneto-resistive elements;
   a second isolation layer formed on a side of said magneto-resistive elements and said plurality of conductor layers opposite that of a side thereof formed on said first side of said first isolation layer;
   a first magnetic shield formed on a side of said second isolation layer opposite that of a side thereof formed on said magneto-resistive elements, said first magnetic shield layer being positioned adjacent said plurality of magneto-resistive elements and being coupled to a DC potential; and
   notches, each formed in said first magnetic shield layer between adjacent ones of said plurality of magneto-resistive elements.

2. A magneto-resistive head according to claim 1, further comprising a second magnetic shield layer formed on a second side of said first isolation layer and being electrically connected to said first magnetic shield layer.

3. A magneto-resistive head according to claim 1, wherein said plurality of magneto-resistive elements are used as a multitrack reproducing head for a magnetic memory.

4. A magneto-resistive head according to claim 1, wherein said bias field applying means comprises at least one layer of a conductive material disposed adjacent to said magneto-resistive element, said bias field being generated by current flowing through said at least one layer of conductive material.

5. A magneto-resistive head according to claim 1, wherein said bias field applying means comprises at least one permanent magnetic layer isolated from said magneto-resistive elements.

6. A magneto-resistive head according to claim 1, wherein said first magnetic shield layer shields said plurality of magneto-resistive elements.

7. A magneto-resistive head according to claim 1, wherein each of said notches includes an isolator provided therein.

8. A magneto-resistive head according to claim 1, wherein said notches are each formed in said first magnetic shield layer between adjacent ones of said plurality of magneto-resistive elements so that undesirable electric charges which may be accumulative on a portion of said first magnetic shield layer associated with one of said magneto-resistive elements do not flow in another portion of said first magnetic shield layer associated with another one of said magneto-resistive elements adjacent to said one of said magneto-resistive elements in discharging of the undesirable electric charges to said DC potential, said another portion of said first magnetic shield layer being a portion proximate to a recording medium when said magneto-resistive head is utilized for reproduction.

* * * * *